Patented Nov. 16, 1937

2,099,546

UNITED STATES PATENT OFFICE 2,099,546

TREATMENT OF RUBBER

Herman R. Thies, Stow, and George R. Lyon, Akron, Ohio, assignors to Wingfoot Corporation, Wilmington, Del., a corporation of Delaware No Drawing. Application July 22, 1936,
Serial No. 92,014

19 Claims. (Cl. 260—1)

This invention relates to the preparation of condensation derivatives of rubber.

It is known that condensation derivatives of rubber can be produced by treating a rubber cement with sulfuric acid, an aryl sulfonic acid, the halide of amphoteric elements (such as stannic chloride, chromic chloride, aluminum chloride and ferric chloride), a compound such as chlorostannic acid, or even hydrogen halide under properly controlled conditions. Condensation derivatives of higher and lower softening points have been produced by allowing the condensing agents to react on the rubber for longer and shorter times respectively. However, there has never been a satisfactory method of controlling these reactions to produce an end product of a desired softening point. Furthermore, the commercial products have been contaminated with impurities which may advantageously be filtered from the reacted cement.

The filtration of the reacted cement consumes quite a substantial period of time, and unless the reaction is stopped before the filtration is commenced, it will be found that by the time the filtration is completed the reaction has progressed to a considerably greater degree than when the filtration was started. Due to the various circumstances which may arise in plant operations, it was recognized that it would be desirable to complete the reaction prior to filtration, particularly because if the reacting cement is filtered while the condensing agent is acting on the rubber it is not possible to remove impurities formed during the reaction.

According to this invention, therefore, the reaction is carried out on rubber in solution and the action of the condensing agent on the rubber is first terminated and the resulting reacted cement is then filtered. After filtration any desirable procedure may be carried forward. During the reaction of the condensing agent on the rubber, the reacting cement is advantageously sampled from time to time and by any suitable test the extent to which the reaction has been carried forward is determined. One suitable manner of testing where the process has been standardized consists in testing the viscosity of the reacting cement and from the rate of change in viscosity determining when the desired end point will have been reached.

There are various ways of terminating a reaction of this type. Where the termination of a reacting cement is disclosed in the prior art it consists in volatilizing the solvent and thus precipitating the product. This is not suitable where the reacted cement is to be filtered. A preferred method of terminating the reaction according to the process of this invention is to add a small amount of water to the reacting cement. In this way the reaction is terminated regardless of the condensing agent employed. Where the condensing agent is an acid or the halide of an amphoteric element it has been found that alkali may be used to terminate the reaction. Any method of terminating the reaction may be employed according to this invention so long as it does not cause separation of the reacted product from the solvent.

The invention will be illustrated in connection with the treatment of a rubber cement with chlorostannic acid, but it is to be understood that the invention is not limited to reactions in which this condensing agent is employed. The reaction may be effected with any suitable condensing agent such as those above enumerated and then terminated with water before filtering. After filtering the desired end product may be obtained by volatilization of solvent or in any suitable manner. A preferred method of operation is given in the following example.

Rubber with a plasticity in the neighborhood of 300 may be dissolved in sufficient benzene to form a 10% solution. To this solution 10% of crystalline chlorostannic acid based on the weight of the rubber is added. The reaction mixture is heated to boiling under a reflux condenser with agitation to cause the chlorostannic acid to act on the rubber. After the reaction has been carried to the extent desired it is terminated by the addition of water, for example ½ pound of water for each pound of chlorostannic acid used. Or the reaction may be terminated by the addition of a base such as 40 grams of sodium hydroxide dissolved in water for each pound of chlorostannic acid used. Instead of an aqueous solution of a base gaseous ammonia may be employed or alcoholic potash or other non-aqueous base may be used. If an aqueous base is employed sodium hydroxide is preferred although potassium hydroxide or other strong base may be used, preferably a base which will not discolor the product and one which will produce salts which are readily soluble.

If a paint is to be made or if the end product is to be used for molding, it will generally be desirable to stop the reaction in this way, then cool the reaction mixture and filter it and then split down the metallic addition compound which appears to be formed and remove soluble salts by pouring the filtered solution into 2½ or three volumes of water with sufficient agitation to produce an emulsion. By steam distillation of the emulsion with agitation the benzene is volatilized and the end product precipitated. This end product is a chlorine-containing rubber derivative with a $(C_5H_8)_x$ nucleus in which more carbon atoms are directly connected than in rubber.

This case is in part a continuation of our application Serial No. 699,634 filed November 24, 1933.

We claim:

1. The method of producing condensation derivatives of rubber which comprises treating a rubber cement with a condensation agent, terminating the reaction of the condensing agent on the rubber without separating the resulting rubber derivative from the cement and then filtering the reacted cement to remove insoluble impurities.

2. In the method of preparing condensation derivatives of rubber by treating a rubber cement with a condensation agent, the steps which comprise terminating the reaction of the condensing agent on the rubber cement without separating the resulting rubber derivative from the cement and then filtering the reacted cement to remove insoluble impurities.

3. In the method of preparing condensation derivatives of rubber by treating a rubber cement with a condensing agent the steps which comprise terminating the action of the condensing agent on the rubber cement by adding water thereto in amount sufficient to terminate the reaction but insufficient to precipitate the reaction product, and then filtering the reacted cement to remove insoluble impurities.

4. In the method of preparing condensation derivatives of rubber by treating a rubber cement with a condensing agent which is the halide of an amphoteric element, the steps which comprise terminating the action of the condensing agent on the rubber cement by adding alkali thereto without separating the resulting rubber derivative from the cement and then filtering the reacted cement to remove insoluble impurities.

5. In the method of preparing condensation derivatives of rubber by treating a rubber cement with a condensing agent which is the halide of an amphoteric element, the steps which comprise terminating the action of the condensing agent on the rubber cement by adding water thereto in amount sufficient to terminate the reaction but insufficient to precipitate the reaction product and then filtering the reacted cement to remove insoluble impurities.

6. In the method of preparing condensation derivatives of rubber by treating a rubber cement with a condensing agent which is the halide of an amphoteric element, the steps which comprise terminating the action of the condensing agent on the rubber cement without separating the resulting rubber derivative from the cement and then filtering the reacted cement to remove insoluble impurities.

7. In the method of preparing a condensation derivative of rubber by treating a rubber cement with chlorostannic acid the steps which comprise terminating the action of the chlorostannic acid on the rubber cement without separating the resulting rubber derivative from the cement and then filtering the reacted cement to remove insoluble impurities.

8. In the method of preparing a condensation derivative of rubber by treating a rubber cement with chlorostannic acid the steps which comprise terminating the action of the chlorostannic acid on the rubber cement by adding an alkali thereto without separating the resulting rubber derivative from the cement and then filtering the reacted cement to remove insoluble impurities.

9. In the method of preparing a condensation derivative of rubber by treating a rubber cement with chlorostannic acid, the steps which comprise terminating the action of the chlorostannic acid on the rubber cement by adding water thereto in an amount sufficient to terminate the reaction but insufficient to precipitate the reaction product and then filtering the reacted cement to remove insoluble impurities.

10. In the preparation of condensation derivatives of rubber the step of terminating the reaction on rubber in solution of a compound from the class consisting of halides of amphoteric elements and hydrohalides of halides of amphoteric metals, which comprises adding to a solution of the reacting mixture a small amount of a compound from the group consisting of water, an inorganic base and an aqueous solution of an inorganic base, thereby terminating the reaction without causing separation of the condensation derivative from the solution.

11. In the preparation of condensation derivatives of rubber the step of terminating the reaction on rubber in solution of a compound from the class consisting of halides of amphoteric elements and hydrohalides of halides of amphoteric metals, which comprises adding to the solution of the reacting mixture a small amount of water, thereby terminating the reaction without causing separation of the rubber derivative from the solution.

12. In the preparation of condensation derivatives of rubber the step of terminating the reaction of a halide of an amphoteric element on rubber in solution which comprises adding a small amount of water to a solution of the reaction mixture, thereby terminating the reaction without causing separation of the rubber derivative from the solution.

13. In the preparation of condensation derivatives of rubber the step of terminating the reaction of tin tetrachloride on rubber in solution which comprises adding a small amount of water to the solution of the reacting mixture, thereby terminating the reaction without causing separation of the rubber derivative from the solution.

14. In the preparation of condensation derivatives of rubber the step of terminating the reaction of chlorostannic acid on rubber in solution which comprises adding a small amount of water to the solution of the reacting mixture, thereby terminating the reaction without causing separation of the rubber derivative from the solution.

15. In the preparation of condensation derivatives of rubber the steps which comprise terminating the reaction on rubber in solution of a halide of an amphoteric element by adding thereto a small amount of a compound from the group consisting of water, an inorganic base and an aqueous solution of an inorganic base, thereby terminating the reaction without causing separation of the rubber derivative from the solution, filtering to remove insoluble impurities and then separating the condensation derivative of rubber from the filtrate by adding water thereto.

16. In the preparation of condensation derivatives of rubber by the reaction on rubber in solution of a condensing agent which is a compound from the class consisting of halides of amphoteric elements and hydrohalides of halides of amphoteric metals the steps which comprise adding to a solution of the reaction mixture obtained by the action of the condensing agent on rubber in solution a small amount of a compound from the group consisting of water, an inorganic base and an aqueous solution of an inorganic base, thereby terminating the reaction without causing separation of the rubber derivative from the solution to remove insoluble impurities, filtering the solution and thereafter precipitating the condensation derivative of rubber.

17. In the preparation of condensation derivatives of rubber the steps which comprise acting on rubber in solution with chlorostannic acid and terminating the reaction by adding to the solution a small amount of a compound from the group consisting of water, an inorganic base and an aqueous solution of an inorganic base, thereby terminating the reaction without causing separation of the rubber derivative from the solution.

18. In the preparation of condensation derivatives of rubber the steps which comprise treating rubber in solution with chlorostannic acid, terminating the reaction without causing separation of the reaction product by adding a small amount of water to the solution of the reacting mixture, filtering the reacted solution to remove insoluble impurities and thereafter separating the condensation derivative of rubber therefrom.

19. The method of forming condensation derivatives of rubber which comprises reacting on rubber in solution with chlorostannic acid and by adding a small amount of an inorganic base to the reaction mixture terminating the reaction without causing the rubber derivative thus formed to separate from solution.

GEORGE R. LYON.
HERMAN R. THIES.

CERTIFICATE OF CORRECTION.

Patent No. 2,099,546. November 16, 1937.

HERMAN R. THIES, ET AL.

It is hereby certified that error appears in the printed specification of the above numbered patent requiring correction as follows: Page 3, first column, lines 9 and 10, claim 16, strike out the comma and words ", filtering the solution" and insert the same after the syllable "tion" in line 9, same claim; and that the said Letters Patent should be read with this correction therein that the same may conform to the record of the case in the Patent Office.

Signed and sealed this 8th day of February, A. D. 1938.

(Seal)

Henry Van Arsdale,
Acting Commissioner of Patents.